July 5, 1932.  A. C. WISNER  1,866,383
HYDRAULIC PRESS
Filed Sept. 8, 1928   4 Sheets-Sheet 2

INVENTOR.
A.C. Wisner,
BY
ATTORNEY.

July 5, 1932.   A. C. WISNER   1,866,383
HYDRAULIC PRESS
Filed Sept. 8, 1928   4 Sheets-Sheet 3
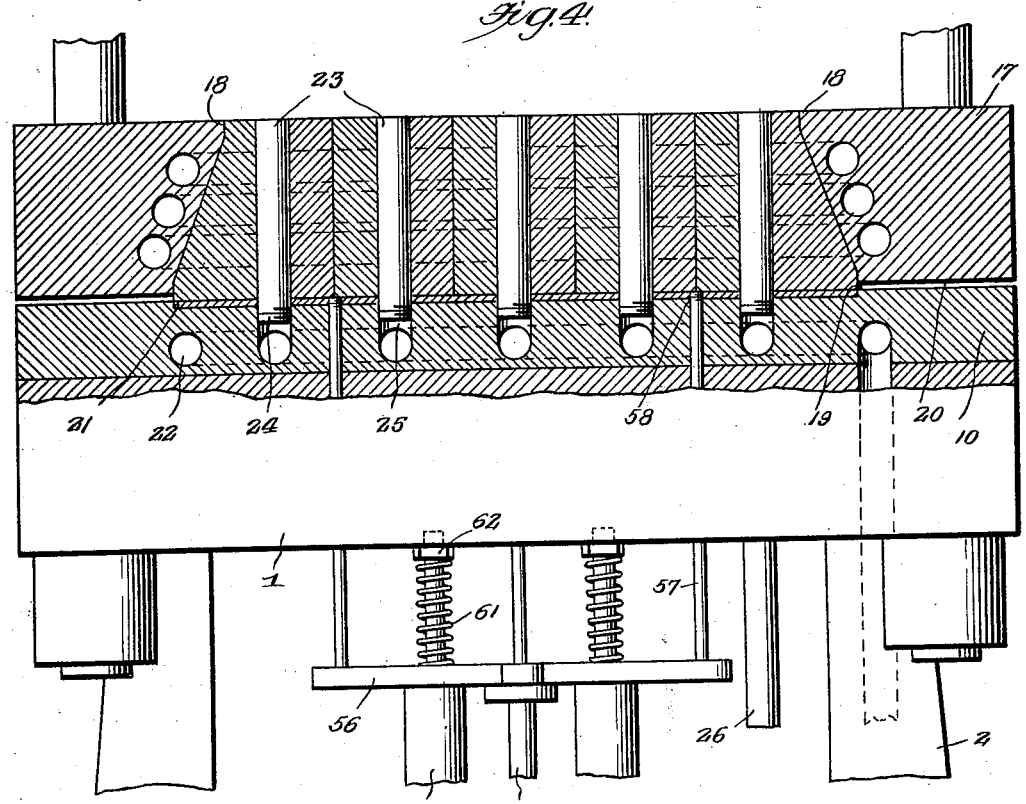
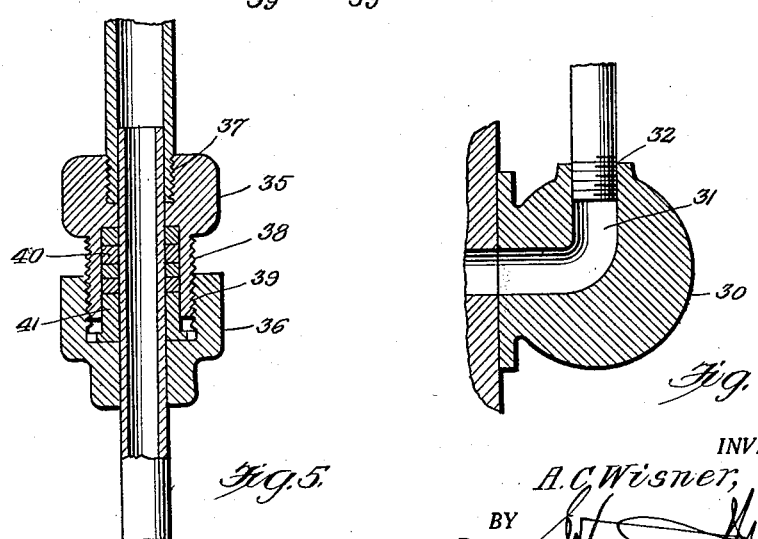
INVENTOR.
A.C.Wisner,
BY
ATTORNEY.

July 5, 1932.  A. C. WISNER  1,866,383
HYDRAULIC PRESS
Filed Sept. 8, 1928  4 Sheets-Sheet 4
Fig. 7.
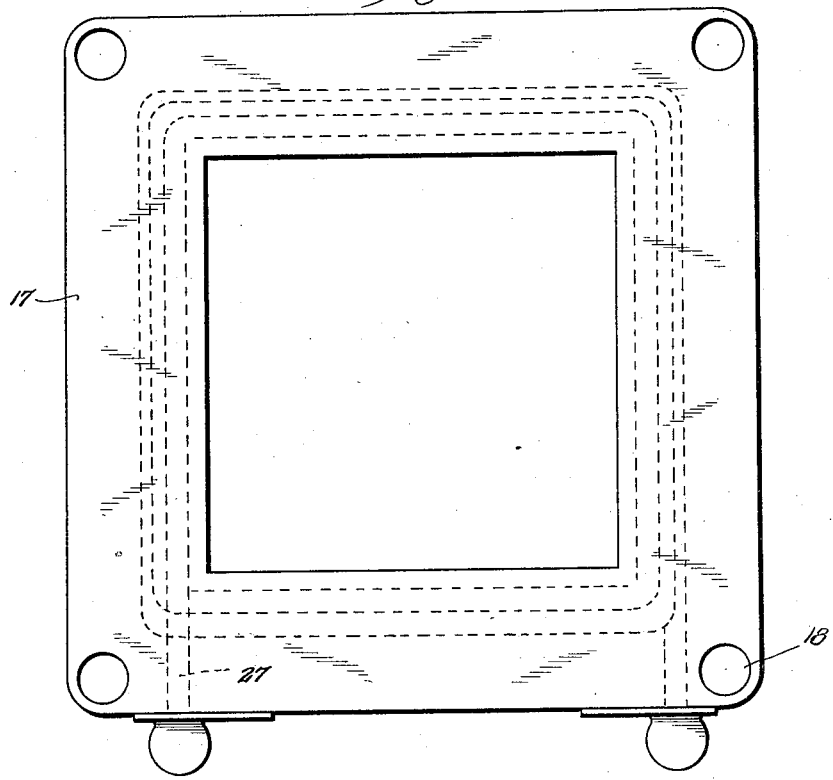
Fig. 8.
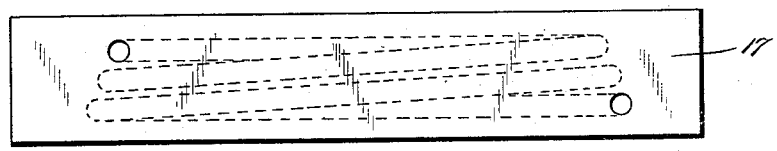
Fig. 9.
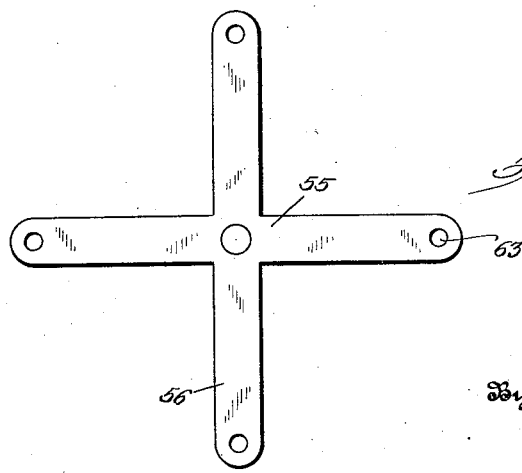
Inventor
A. C. Wisner,
By 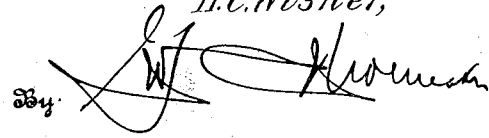
Attorney Patented July 5, 1932

1,866,383

UNITED STATES PATENT OFFICE

ABRAM C. WISNER, OF JACKSON, MICHIGAN, ASSIGNOR TO REYNOLDS SPRING COMPANY, OF JACKSON, MICHIGAN

HYDRAULIC PRESS

Application filed September 8, 1928. Serial No. 304,644.

The invention relates to improvements in hydraulic presses.

The object of the present invention is to improve the construction of hydraulic presses for molding articles from bakelite or other plastic material and to equip a press of this character with a separable mold structure adapted to be employed in a press for molding a single relatively large article at each operation, such as a battery case, or a considerable number of smaller articles, such as parts of electrical fixtures of various kinds. In practice, a sectional mold may be provided for molding any desired number of articles of various sizes within the capacity of the press.

A further object of the invention is to provide means for circulating a heating medium through both movable and stationary portions of the mold structure for maintaining the mold and the adjacent parts in a heated condition at the proper temperature during the molding operation, and for circulating a cooling medium after the molding operation has been completed for reducing the temperature of the mold and the adjacent parts to set the material of the molded article or articles, whereby the time required for molding such articles will be reduced to a minimum.

Another object of the invention is to provide a separable mold adapted to be quickly assembled on a press preparatory to molding and capable after the molding operation has been completed of being readily removed for separation of the mold sections to permit removal of the molded articles.

Another object of the invention is to provide a separable mold of light character adapted to reduce the amount of metal ordinarily required for molds, thereby lessening the cost of construction of molds and facilitating the rapid and easy handling of the same.

Another object of the invention is to enable a relatively large number of sections of a separable mold when in position in the press to be firmly supported and securely gripped to enable the mold to withstand the pressure incident to such molding operations without liability of accidental separations of the sections or displacement of any of the parts when subjected to excessive pressures.

With these and other objects in view, the invention consists in the construction and novel combination and arrangement of parts hereinafter fully described, illustrated in the accompanying drawings, and set forth in the claims hereto appended, it being understood that various changes in the form, proportion, and minor details of construction, within the scope of the claims, may be resorted to without departing from the spirit of the invention or sacrificing any of the advantages thereof.

In the drawings:

Fig. 4 is a transverse sectional view of a portion of the hydraulic press, parts being shown in elevation, and illustrating the upright pipes and passages for controlling the temperature of the mold.

Fig. 5 is an enlarged detail sectional view of one of the slip joint couplings.

Fig. 6 is an enlarged detail sectional view illustrating the construction of the end couplings.

Fig. 7 is a plan view of the vertically movable chase.

Fig. 8 is a side elevation of the same.

Fig. 9 is a plan view of the four-arm cross head of the mold lifting mechanism.

The accompanying drawings illustrate one embodiment of the invention, while the claims define the scope thereof.

Figure 1:
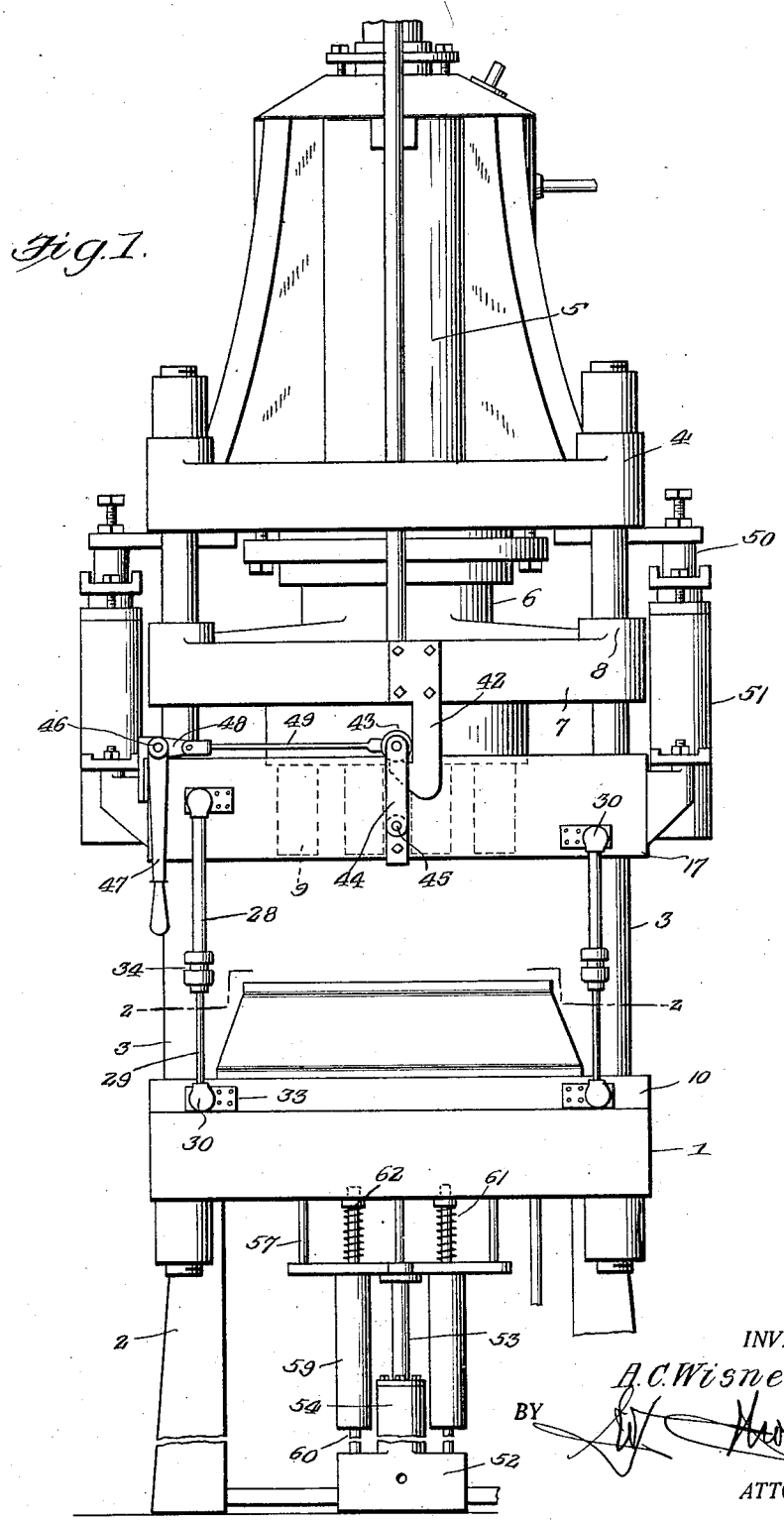
Figure 1 is an elevation of a hydraulic press of the inverted ram type provided with a separable mold constructed in accordance with this invention for simultaneously molding a plurality of articles.

The hydraulic press, in the embodiment illustrated in the accompanying drawings, is designed for molding various articles of bakelite or other plastic material, and comprises in its construction a pedestal comprising a horizontally disposed rectangular bed plate 1 and supporting legs 2, as clearly illustrated in Fig. 1 of the drawings, but any other form of base may be employed, as will be readily understood. The bed plate is pierced at the corners by the lower ends of vertical guide posts 3 which support at their upper ends a stationary horizontally disposed platen 4 having formed integral therewith an upper main ram cylinder 5. The ram cylinder 5, which is vertically disposed, is closed at its upper end and is open at its lower end to receive a cylindrical ram 6 which is connected with and carries a vertically movable platen 7. The inverted main ram, which actuates the vertically movable platen 7, may be of any desired construction, and is operated by fluid pressure in the usual manner, and as the particular construction of the inverted main hydraulic ram does not constitute a portion of the present invention, further illustration thereof is deemed unnecessary. The main ram, however, is preferably constructed as shown and described in my co-pending application, filed on or about July 5, 1928, Serial No. 290,597.

The vertically movable platen 7 is provided at its corners with suitable enlargements 8 through which the corner posts pass and which slide on and are guided by the said corner posts 3. This vertically movable platen is provided with a plurality of depending punching members 9 which cooperate with a separable mold which is mounted upon the bed plate, being supported by a fixed steam plate 10 of rectangular form arranged upon the bed plate 1 and preferably conforming to the configuration thereof, as illustrated in Fig. 1 of the drawings.

Figure 2:
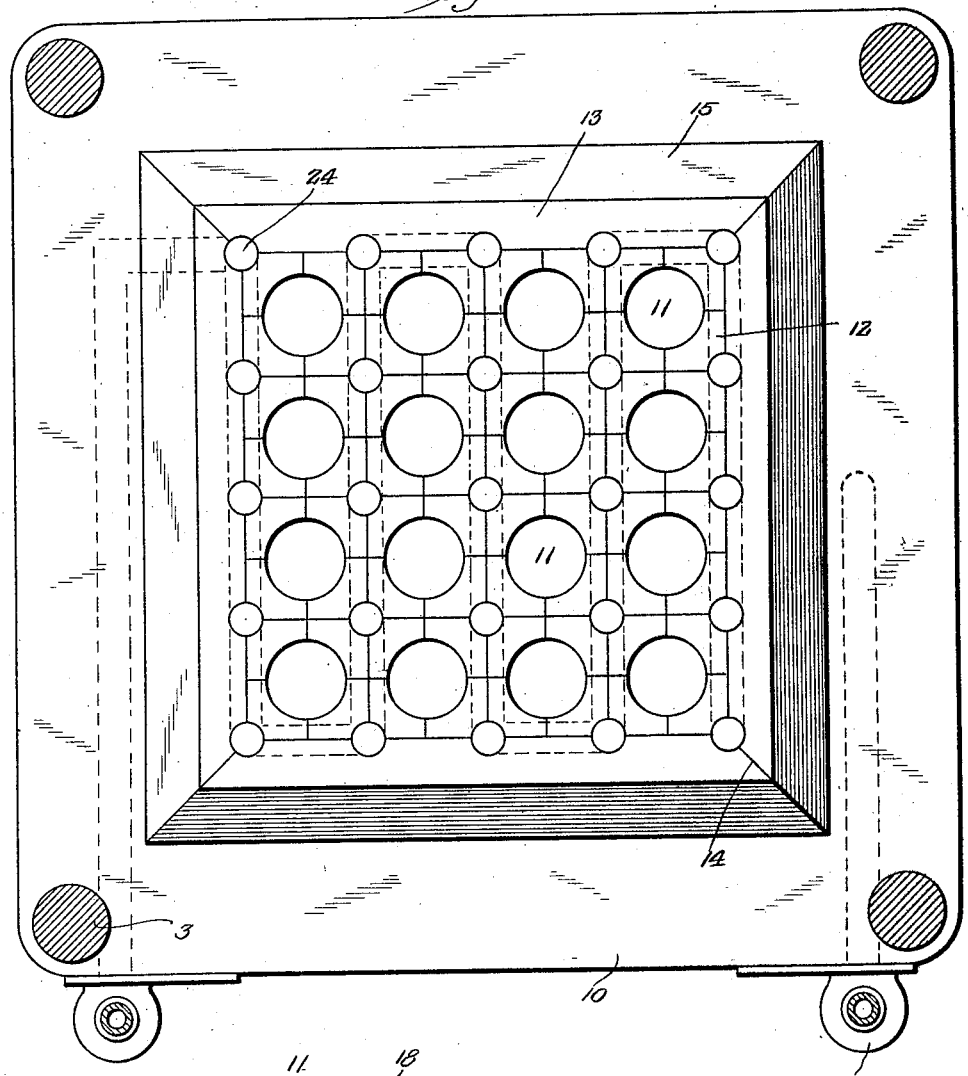
Fig. 2 is a horizontal sectional view taken substantially on the line 2—2 of Fig. 1, with the chase elevated.
Figure 3:
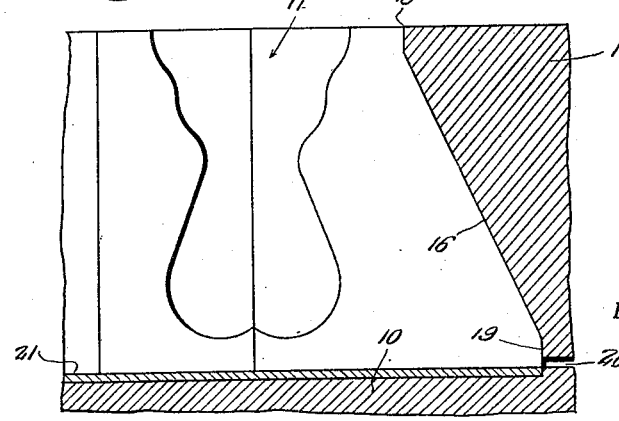
Fig. 3 is an enlarged vertical section through one side of the mold, the chase being in molding position and holding the sections of the mold together.

The separable mold is provided with a plurality of mold cavities 11 formed by mold sections 12. Any desired number of mold cavities 11 may be provided, and the mold is sectional to enable an irregularly shaped article of the form of the mold cavity illustrated in Fig. 3 of the drawings to be readily removed after the molding operation has been completed. A sectional mold having a single cavity or a sectional mold having a relatively large number of mold cavities may, of course, be provided, and the number of mold cavities which may be provided in a sectional mold is limited only by the capacity of the hydraulic press. The bodies of sockets, plugs and various other forms of fixtures for electrical and other work have irregular shapes, and require a sectional or collapsible mold to permit removal of the articles after the molding operation has been completed, and in the mold illustrated in the accompanying drawings each of the mold cavities 11 is formed by four mold sections having vertical outer side faces and vertical inner abutting side faces, as clearly indicated in Figs. 2 and 3 of the drawings. The mold sections 12 form a plurality of mold units which are arranged within marginal mold sections 13 tapered at their ends at 14 to form mitre joints and constituting a sectional frame around the units of the mold. The marginal sections 13 are tapered upwardly in cross section to provide upwardly and inwardly inclined side faces 15 which cooperate with downwardly and outwardly inclined side faces 16 of a vertically movable chase 17. The chase 17, which is provided at its corners with openings 18ª to receive the guide posts 3, is slidable vertically on the same and the marginal sections 13 of the mold, and the sides of the chase are provided at the top and bottom of the said inclined faces 16 with short vertical faces, as clearly illustrated at 18 and 19 in Fig. 3 of the drawings, and the said chase when in its lowered position surrounding and in engagement with the sectional mold, is elevated above and separated from the bed plate by a relatively small space 20, as illustrated in Fig. 3 of the drawings. By this construction and arrangement, the sectional mold is subjected to the entire weight of the chase and the latter is adapted by its wedging action through the inclined faces 15 and 16 to firmly grip and securely hold the sectional mold. Also, this will compensate for any slight wear of the parts, so that the sectional mold will be subjected to the weight of the chase. The vertical faces at the ends of the inclined faces prevent any lateral pressure exerted by the sections of the mold against the chase from being transmitted to the end face 16 of the chase. This will prevent any lateral pressure of the sectional mold from lifting or tending to lift the chase from its lowered gripping and clamping position. The vertically movable chase, as clearly illustrated in Fig. 7 of the drawings, is rectangular, and consists of a single piece to afford the necessary strength, but it may be constructed in any other suitable manner, as will be readily understood.

The separable sectional mold, which is preferably arranged on a thin bottom plate 21, is maintained at the desired temperature during the molding operation by means of steam or other fluid which is circulated through suitable passages 22 in the fixed steam plate 10 and through upright pipes 23 rising from the fixed steam plate and extending through vertical openings 24 of the sectional mold, as clearly illustrated in Fig. 4 of the drawings. The upper ends of the upright pipes 23 are closed and their lower ends 24 are threaded and secured in suitable sockets 25 provided in the fixed steam plate and communicating with the passages 22. The passages 22, as indicated in dotted lines in Fig. 2 of the drawings, extend back and forth across the steam plate, the parallel portions being connected at opposite sides of the steam plate as shown in Fig. 2, but any other suitable arrangement of the passages may, of course, be employed, as will be readily understood. The openings 24 of the sectional mold are formed by registering recesses in the adjacent sections of the mold, and the number of the perpendicular pipes 23 may, of course, be varied, as will be readily understood, and they are preferably located in rows with the said pipes 23 preferably located at the corners of the mold units formed by the mold sections.

The steam or cold water or other temperature controlling medium is introduced into the passages of the fixed steam plate 10 by an inlet pipe 26 which extends upwardly through the bed plate 1 as clearly illustrated in Fig. 4 of the drawings, and circulates through the passages of the fixed steam plate and enters the upright pipes 23 and passes from the left-hand side of the steam plate, as illustrated in the dotted lines in Fig. 2 of the drawings, and is conducted to passages 27 of the vertically movable chase, and is exhausted therefrom by means of pipe connections located at opposite sides of the hydraulic press and preferably consisting of telescoping sections 28 and 29 connected by end couplings 30 with the steam plate 10 and the vertically movable chase 17, but any other suitable pipe connection which will permit the vertical movement of the chase may, of course, be employed. The end coupling 30 preferably consists of a substantially ball shaped body having an L-shaped passage 31 which communicates with the adjacent telescoping section and with the adjacent passage of the steam plate or vertically movable chase, as clearly illustrated in Fig. 6 of the drawings. The telescoping sections 28 and 29 are preferably threaded into the end couplings 30, as illustrated at 32 in Fig. 6, and the said end couplings 30 having attaching plates 33 which are secured by screws or other suitable fastening devices to the adjacent side faces of the fixed steam plate and the vertically movable chase, as clearly shown in Fig. 1 of the drawings. The adjacent ends of the telescoping sections are arranged in slip joint couplings 34 composed of threaded sections 35 and 36, as clearly illustrated in Fig. 5 of the drawings. The coupling sections are tubular to receive the telescoping sections, and the section 35 has its bore opening enlarged and threaded to receive the section 28, as shown at 37. The said section 35 of the slip joint coupling has a reduced threaded lower portion 38 to receive the coupling section 36 which has the upper portion 39 of its bore enlarged and threaded to engage the section 35.

The bore or opening of the reduced threaded portion 38 of the slip joint coupling is enlarged to receive a suitable packing 40 and a metallic gland 41 which is preferably flanged at its lower end and which is forced into engagement with the packing 40 to provide a steam and water tight joint by means of the threaded connections between the sections of the slip joint coupling. The telescoping sections 28 and 29 are arranged vertically and permit the vertical movement of the chase without interrupting the pipe connections by the passages of the fixed steam plate and the chase. As illustrated in dotted lines in Figs. 7 and 8 of the drawings, the passages 27 extend entirely around the rectangular chase, and any number of passages may, of course, be employed, and they are preferably arranged in spiral formation, as indicated in Fig. 8, but any other suitable arrangement may, of course, be provided. The pipe connections between the steam plate and the vertically movable chase and the passages in the chase and steam plate permit either steam or any other heating medium to be circulated through and around the mold for maintaining the mold at the desired temperature during the molding operation, and after the molding operation has been completed the heating medium may be exhausted from the said passages and water of the desired temperature may be circulated through the said passages for reducing the temperature of the mold to facilitate rapid setting of the material and thereby reduce the time required for a complete molding operation to a minimum.

The mechanism for raising and lowering the chase is shown and described and claimed in my said co-pending application, and comprises hooks 42 secured to and depending from opposite sides of the vertically movable platen 7 and adapted to engage with rollers 43 carried by links 44 pivotally mounted on the chase at 45. As described in the aforesaid application, the hooks are adapted to automatically engage the rollers of the links in the downward movement of the platen, and the chase is lifted to the elevated position shown in Fig. 1 of the drawings when the platen 7 is elevated. When it is desired to lower the chase, the rollers are disengaged from the hooks by operating mechanism consisting of a shaft 46 having a gravity acting operating arm 47 and provided at opposite sides with an arm 48 which is connected by a link rod 49 with the adjacent link 44. The chase is lowered by means of rams 50 secured to the stationary platen 4 and operating in cylinders 51 mounted on the chase at opposite sides thereof. These side rams are constructed and operated as shown and described in the said co-pending application, and no claim is made in the present application to the mechanism for raising and lowering the chase, as these features are claimed in the said co-pending application.

The thin bottom plate 21 facilitates the ready removal of the sectional mold, and this may be arranged for removal by hand or by suitable mechanism. In the accompanying drawings, the bottom plate is moved vertically to lift the sectional mold clear of the upright pipes 23 by means of a lower ram 52 consisting of a solid piston 53 operating in a vertical ram cylinder 54 and connected at its upper end and carrying a cross head 55 having four arms 56 which are connected to the lower ends of vertical rods 57 extending through the bed plate 1 and the fixed steam plate 10 and having their upper ends 58 threaded in openings in the bottom plate 21. When the chase 17 is elevated the ram 52 is adapted to be operated to lift the bottom plate and the sectional mold to an elevated position clear of the upright pipes 23 to enable the sectional mold to be readily separated for the removal of the molded articles. The cross head is guided in its vertical movement by means of sleeves 59 slidably arranged on guide rods 60 and connected at their upper ends to the cross head. The downward movement of the cross head is effected by gravity, supplemented by the action of coiled springs 61 disposed on the upper portions of the guide rods and interposed between the cross head and nuts 62 mounted on the upper portions of the guide rods and engaging the lower face of the bed plate. The lower ends of the guide rods are mounted on the ram 52 at opposite sides thereof and the upper ends of the said guide rods are preferably threaded into the lower face of the bed plate 1 and secured to the same by lock nuts 62. Any other suitable arrangement of lifting mechanism may, of course, be employed for raising and lowering the bottom plate of the sectional mold. After the mold has been elevated and the sections separated and the articles removed, the bottom plate may be lowered, and after the same has been lowered the sections of the mold may be re-assembled in molding position. The lifting rods 57 may be secured in openings 63 in the outer ends of the arms of the cross head by any suitable means, and the lifting rods and cross heads may be formed in any other desired manner, as will be understood.

What is claimed is:

1. A hydraulic press including a separable mold having a mold cavity and composed of a plurality of separable sections, and a vertically movable chase surrounding the separable mold for holding the sections in molding position, said mold and chase having cooperating inclined faces effecting a wedging action of the chase on the mold to grip and clamp the said mold sections, the said chase and mold being provided at the top and bottom of the said inclined faces with short vertical faces.

2. A hydraulic press including a separable mold having a mold cavity and composed of a plurality of separable sections, and a vertically movable chase surrounding the separable mold for holding the sections in molding position, said mold and chase having cooperating inclined faces effecting a wedging action of the chase on the mold to grip and clamp the said mold sections, the said chase and mold being provided at the top and bottom of the said inclined faces with short vertical faces, and the chase being in a slightly elevated position when at the limit of its downward movement to subject the sectional mold to the entire weight of the chase.

3. A hydraulic press including a separable mold provided with a mold cavity and composed of separable sections surrounding the mold cavity, said mold sections being also provided with registering recesses forming vertical openings, and heating elements extending into the openings formed by the said recesses.

4. A hydraulic press including a separable mold provided with a mold cavity and composed of separable sections surrounding the mold cavity, said mold sections being also provided with registering recesses forming vertical openings, and fixed vertical heating elements extending into the openings of the sectional mold from the bottom thereof, the sectional mold being adapted to be lifted clear of the heating elements to permit separation of the sections.

5. A hydraulic press including a separable mold provided with a plurality of mold cavities and composed of separable mold sections surrounding the mold cavities and marginal sections fitting against the outer sides of the adjacent mold sections and extending around the sectional mold, said sections being provided with registering recesses forming vertical openings adjacent the mold cavities, and fixed vertical heating elements extending into the openings of the sectional mold from the bottom thereof.

6. A hydraulic press including a separable mold provided with a plurality of mold cavities and composed of separable mold sections surrounding the mold cavities and marginal sections fitting against the outer sides of the adjacent mold sections and extending around the sectional mold, said sections being provided with registering recesses forming vertical openings adjacent the mold cavities, fixed vertical heating elements extending to the openings of the sectional mold from the bottom thereof, and a bottom plate having passages for the vertical heating elements and supporting the sectional mold and adapted to be elevated to lift the sectional mold clear of the heating elements.

7. A hydraulic press including a fixed steam plate having passages and provided with upright pipes communicating with the said passages, and a sectional mold having mold cavities and composed of mold sections provided with registering recesses forming vertical openings receiving the upright pipes.

8. A hydraulic press including a stationary steam plate provided with passages, a mold composed of separable sections and supported by the steam plate, a vertically movable chase surrounding the mold and holding the sections against separation and in molding position, said chase being provided with passages for a temperature controlling fluid, pipe connections between the steam plate and the vertically movable chase having telescoping sections, a vertically movable platen having means cooperating with the mold, and means for connecting the vertically movable platen with the chase and disconnecting it therefrom.

9. A hydraulic press including a stationary steam plate provided with passages, a mold composed of separable sections and supported by the steam plate, a vertically movable chase surrounding the mold and holding the sections against separation and in molding position, said chase being provided with passages for a temperature controlling fluid, pipe connections between the steam plate and the vertically movable chase having telescoping sections and provided at the adjacent portions of the telescoping sections with a slip joint coupling having a compressible packing, a vertically movable platen having means cooperating with the mold, and means for connecting the vertically movable platen with the chase and disconnecting it therefrom.

10. A hydraulic press including a fixed steam plate, a separable mold composed of sections mounted on the steam plate, a vertically movable chase surrounding the separable mold and holding the sections against separation and in molding position, said steam plate and chase being provided with passages for a temperature controlling fluid, end couplings secured to the steam plate and the chase and provided with passages communicating with the passages of the steam plate and the chase, vertical telescoping pipe sections secured at their outer ends to the end couplings, and forming an extensible connection to permit the chase to be raised and lowered without interfering with the circulation of a temperature controlling medium, a vertically movable platen having means cooperating with the mold, and means for connecting the vertically movable platen with the chase and disconnecting it therefrom.

11. A hydraulic press including a fixed steam plate, a separable mold composed of sections mounted on the steam plate, a vertically movable chase surrounding the separable mold and holding the sections against separation and in molding position, said steam plate and chase being provided with passages for a temperature controlling fluid, end couplings secured to the steam plate and the chase and provided with passages communicating with the passages of the steam plate and the chase, vertical telescoping pipe sections secured at their outer ends to the end couplings and forming an extensible connection to permit the chase to be raised and lowered without interfering with the circulation of a temperature controlling medium, and a slip joint coupling composed of tubular sections having a threaded connection and provided with a compressible packing surrounding one of the telescoping sections, said slip joint coupling being secured to the other of the said telescoping sections.

12. A hydraulic press including a steam plate provided with passages for a temperature controlling medium, upright pipes rising from the steam plate and communicating with the said passages, a separable mold composed of sections having registering recesses forming vertical openings into which the said upright pipes extend, a vertically movable chase surrounding the separable mold and holding the sections against separation and provided with passages extending around the chase, and pipe connections between the passages of the chase and the passages of the steam plate, each pipe connection comprising telescoping pipe sections, couplings connecting the ends of the pipe sections to the steam plate and the chase, and a slip joint coupling carried by the inner end of one of the telescoping pipe sections and having a packing slidably embracing the other telescoping pipe section.

13. A hydraulic press including a sectional mold provided with a plurality of mold cavities and composed of relatively small mold sections surrounding the mold cavities, and marginal sections corresponding in length to the dimensions of the mold and fitted together at their ends and fitting against the outer sides of the adjacent mold sections, and a vertically movable chase surrounding the sectional mold and holding the sections against separation.

In testimony whereof I have hereunto set my hand, this 5th day of September, 1928.

ABRAM C. WISNER.